(12) United States Patent
Choi et al.

(10) Patent No.: US 11,996,242 B2
(45) Date of Patent: May 28, 2024

(54) MULTILAYER CAPACITOR

(71) Applicant: SAMSUNG ELECTRO-MECHANICS CO., LTD., Suwon-si (KR)

(72) Inventors: Byeong Guk Choi, Suwon-si (KR); Dong Yeong Kim, Suwon-si (KR); Chung Hyeon Ryu, Suwon-si (KR); Seung Been Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 56 days.

(21) Appl. No.: 17/714,710

(22) Filed: Apr. 6, 2022

(65) Prior Publication Data

US 2023/0207207 A1 Jun. 29, 2023

(30) Foreign Application Priority Data

Dec. 24, 2021 (KR) .......................... 10-2021-0187060

(51) Int. Cl.
  *H01G 4/30* (2006.01)
  *H01G 4/008* (2006.01)
  *H01G 4/012* (2006.01)

(52) U.S. Cl.
  CPC ............... *H01G 4/30* (2013.01); *H01G 4/008* (2013.01); *H01G 4/012* (2013.01)

(58) Field of Classification Search
  CPC ........ H01G 4/008; H01G 4/1227; H01G 4/12; H01G 4/232; H01G 4/30; H01G 4/012; H01G 4/228
  See application file for complete search history.

(56) References Cited

U.S. PATENT DOCUMENTS

2009/0284897 A1* 11/2009 Itamura .................. H01G 4/232
  29/25.42
2015/0022940 A1* 1/2015 Han ........................ H01G 4/30
  252/514
2015/0053472 A1* 2/2015 Lee ........................ H01G 4/232
  361/301.4

(Continued)

FOREIGN PATENT DOCUMENTS

JP      2001-338830 A     12/2001
JP      6890940 B2        6/2021

*Primary Examiner* — Michael P McFadden
(74) *Attorney, Agent, or Firm* — Morgan, Lewis & Bockius LLP

(57) ABSTRACT

A multilayer capacitor includes a body including a dielectric layer and a plurality of internal electrodes stacked on each other having the dielectric layer interposed therebetween; and external electrodes including electrode layers positioned externally on the body and connected to the internal electrodes, respectively, wherein the body includes a first surface and a second surface, opposing each other, and to which the plurality of internal electrodes are respectively exposed, and a third surface and a fourth surface which are connected to the first surface and the second surface, and oppose each other in a direction in which the plurality of internal electrodes are stacked on each other, each of the electrode layers including a first region covering the first or second surface and a second region covering the third or fourth surface and having surface roughness lower than that of the first region.

14 Claims, 7 Drawing Sheets

(56) References Cited

U.S. PATENT DOCUMENTS

| | | | |
|---|---|---|---|
| 2018/0082787 A1* | 3/2018 | Hamamori | H01G 4/2325 |
| 2018/0082792 A1 | 3/2018 | Satoh et al. | |
| 2019/0027677 A1* | 1/2019 | Kishimoto | H10N 30/871 |
| 2020/0152390 A1* | 5/2020 | Yeon | H01G 4/012 |

* cited by examiner

II-II'

A

B

MULTILAYER CAPACITOR

CROSS-REFERENCE TO RELATED APPLICATION(S)

This application claims benefit of priority to Korean Patent Application No. 10-2021-0187060 filed on Dec. 24, 2021 in the Korean Intellectual Property Office, the disclosure of which is incorporated herein by reference in its entirety.

TECHNICAL FIELD

The present disclosure relates to a multilayer capacitor.

BACKGROUND

A capacitor is a device which may store electricity, and the electricity may generally be accumulated in each of two electrodes of the capacitor when a voltage is applied to the capacitor in a state in which the two electrodes are disposed opposite to each other. In a case in which a direct current (DC) voltage is applied to the capacitor, a current may flow in the capacitor while the electricity is accumulated in the capacitor. However, the current may not flow in the capacitor when the accumulation of the electricity is completed. Meanwhile, in a case in which an alternating current (AC) voltage is applied to the capacitor, an AC current may flow in the capacitor while polarities of the electrodes are alternated with each other.

The capacitor may be classified into several types, based on a type of an insulator positioned between the electrodes such as an aluminum electrolytic capacitor in which the electrodes are made of aluminum and a thin oxide film is disposed between these aluminum electrodes, a tantalum capacitor in which tantalum is used as an electrode material, a ceramic capacitor in which a dielectric material having a high dielectric constant such as a titanium barium is positioned between the electrodes, a multilayer ceramic capacitor (MLCC) in which ceramic having a high dielectric constant, formed in a multilayer structure, is used as a dielectric material positioned between the electrodes, a film capacitor in which a polystyrene film is used as a dielectric material positioned between the electrodes, etc.

Among these capacitors, the multilayer ceramic capacitor has excellent temperature and frequency characteristics to be implemented in a small size, and has thus been recently used widely in various fields such as a high frequency circuit. In recent years, there have been continuous efforts to make the multilayer ceramic capacitor smaller, and the dielectric layer, internal electrodes and external electrodes thereof are made thinner to this end.

In addition, various efforts have been made to improve moisture-resistance reliability of the multilayer capacitor by reducing defects occurring when moisture or plating solution infiltrates the multilayer capacitor. As one method, either a cover layer of a capacitor body or an external electrode may be made thicker. However, in this case, the corresponding component may have an increased size, and the capacitor may thus have lower capacitance even with the same size.

SUMMARY

An aspect of the present disclosure may provide a multilayer capacitor including an external electrode having improved moisture-resistance reliability through excellent structural stability.

According to an aspect of the present disclosure, a multilayer capacitor includes a body including a dielectric layer and a plurality of internal electrodes stacked on each other having the dielectric layer interposed therebetween, and external electrodes including electrode layers positioned externally on the body and connected to the internal electrodes, respectively, wherein the body includes a first surface and a second surface, opposing each other, and from which the plurality of internal electrodes extend, and a third surface and a fourth surface which are connected to the first surface and the second surface, and oppose each other in a direction in which the plurality of internal electrodes are stacked on each other, each of the electrode layers including a first region covering the first or second surface and a second region covering the third or fourth surface and having surface roughness lower than that of the first region.

The first region and the second region may each include an agglomeration of metal particles.

The first region may include the agglomeration of flake-shaped particles.

The second region may include the agglomeration of spherical particles.

The first region and the second region may each further include a glass component.

The external electrode may further include a resin electrode layer covering the electrode layer, and including a resin layer and metal particles dispersed in the resin layer.

The resin layer of the resin electrode layer may fill a recess portion in a surface of the electrode layer.

The second region may cover edges of the body.

The edges of the body may be regions in which the first surface and the third surface are connected to each other, the first surface and the fourth surface are connected to each other, the second surface and the third surface are connected to each other, and the second surface and the fourth surface are connected to each other.

A portion of the second region, covering the edges of the body, may have a thickness equal to or lower than a minimum thickness of the first region.

A maximum thickness of the first region may be greater than a maximum thickness of the second region.

The first region may have a higher pore density than the second region.

The pore density in the first and second regions may be a ratio of areas in which pores exist in a cross-section of the capacitor, cut in the direction in which the plurality of internal electrodes are stacked on each other.

The first region may be extended to partially cover an end of the second region.

According to an aspect of the present disclosure, a method for manufacturing a multilayer capacitor includes applying a first conductive paste comprising a first metal particle to a first surface of a body of the multilayer capacitor; and applying a second conductive paste comprising a second metal particle to a surface of the body adjacent to the first surface, wherein the second conductive paste is different from the first conductive paste.

The first metal particle and the second metal particle may have different shapes.

The first metal particle may be a flake-shaped particle.

The method may further include applying the second conductive paste to an edge of the body.

The second conductive paste may exclude a flake-shaped particle.

The method may further include sintering the applied second conductive paste before the applying of the first conductive paste.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
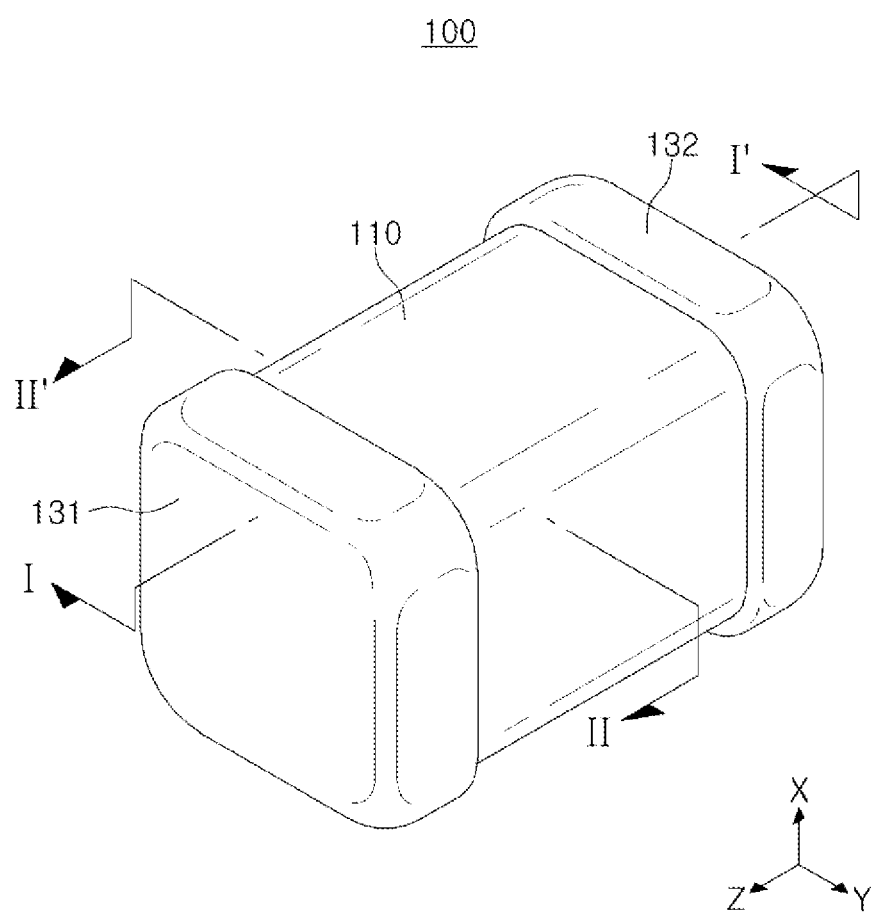
FIG. 1 is a perspective view schematically illustrating an appearance of a multilayer capacitor according to an exemplary embodiment of the present disclosure.
Figure 2:
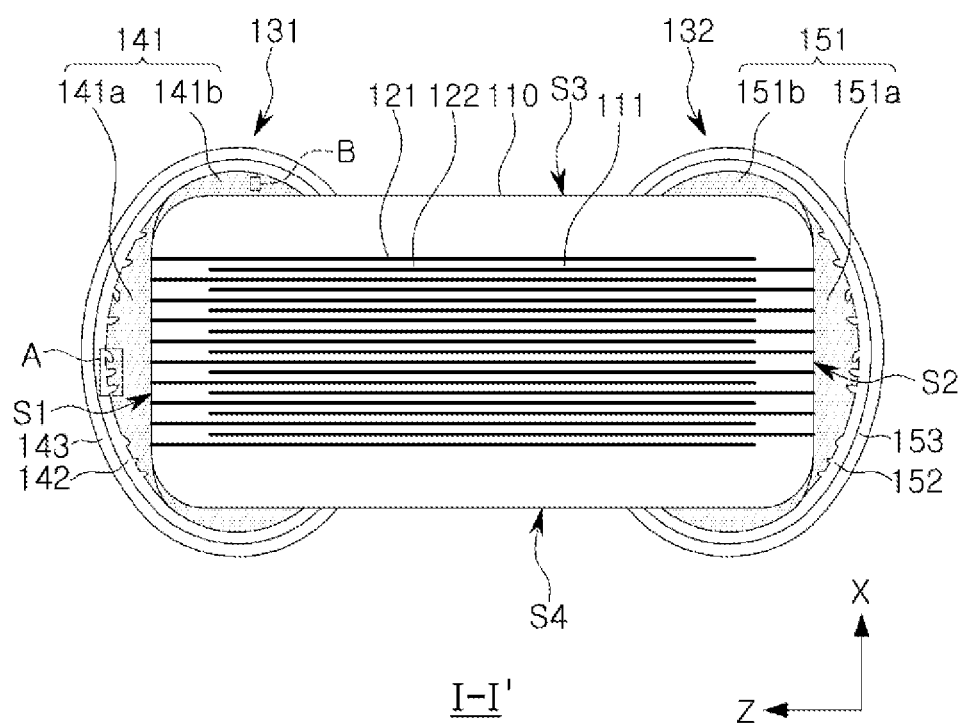
FIG. 2 is a cross-sectional view taken along line I-I' of the multilayer capacitor of FIG. 1.
Figure 3:
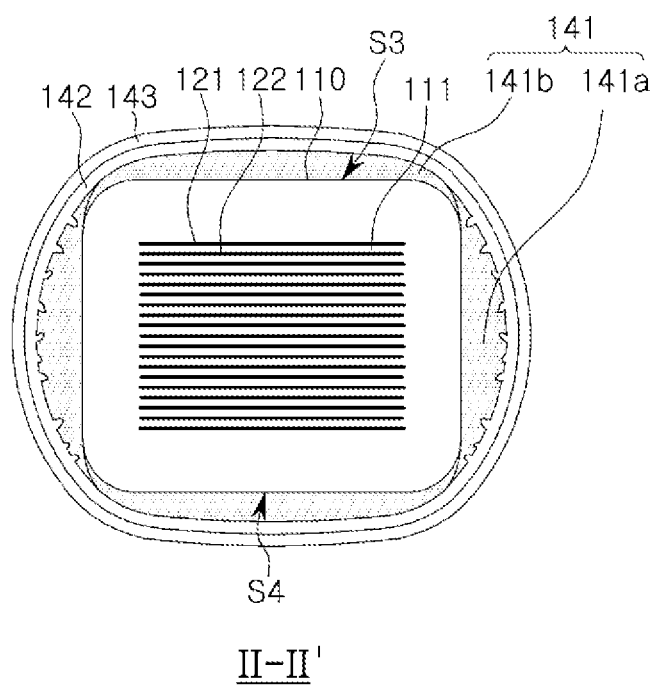
FIG. 3 is a cross-sectional view taken along line II-II' of the multilayer capacitor of FIG. 1.
Figure 4:
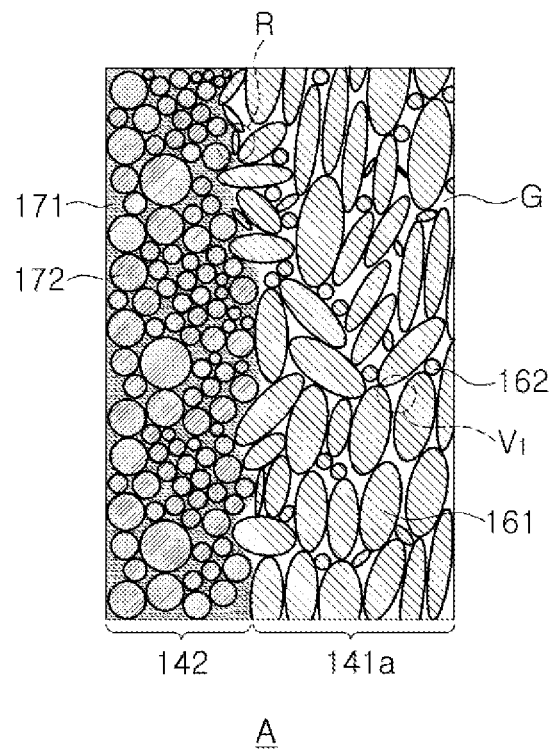
FIGS. 4 and 5 are enlarged cross-sectional views each schematically illustrating a region in an electrode layer of an external electrode.
Figure 5:
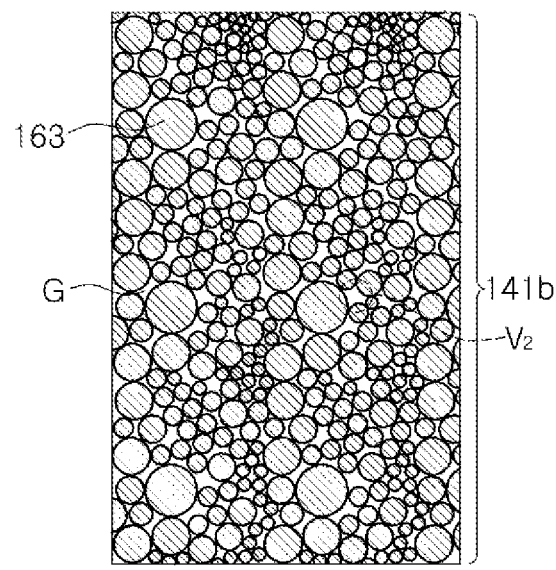

FIG. 1 is a perspective view schematically illustrating an appearance of a multilayer capacitor according to an exemplary embodiment of the present disclosure; FIG. 2 shows an example of a cross-sectional view taken along line I-I' of the multilayer capacitor of FIG. 1; FIG. 3 is an example of a cross-sectional view taken along line II-II' of the multilayer capacitor of FIG. 1; and FIGS. 4 and 5 are enlarged cross-sectional views each schematically illustrating a region in an electrode layer of an external electrode.

Referring to FIGS. 1 through 3, a multilayer capacitor 100 according to an exemplary embodiment of the present disclosure may include: a body 110 including a dielectric layer 111 and a plurality of internal electrodes 121 and 122 stacked on each other disposing the dielectric layer 111 therebetween; and external electrodes 131 and 132, in which the external electrodes 131 and 132 may include electrode layers 141 and 151 respectively including first regions 141a and 151a and second regions 141b and 151b. Here, in the electrode layers 141 and 151, the second regions 141b and 151b may respectively have surface roughness lower than that of the first regions 141a and 151a.

The body 110 may include a stacked structure in which the plurality of dielectric layers 111 are stacked on each other in a first direction (i.e. X-direction), and may be obtained by stacking a plurality of green sheets on each other and then sintering the same for example. The plurality of dielectric layers 111 may have an integrated shape by this sintering process, and may include a plurality of grains. In addition, as shown in FIG. 1, the body 110 may have a shape similar to a rectangular parallelepiped. The dielectric layer 111 included in the body 110 may include a ceramic material having a high dielectric constant, BT-based ceramics, i.e. barium titanate ($BaTiO_3$) based ceramics, for example, and may also include any other material known in the art as long as the capacitor obtains sufficient capacitance. The dielectric layer 111 may further include an additive, an organic solvent, a plasticizer, a binder, a dispersant and the like, if necessary, in addition to the ceramic material which is a main component. Here, when using the additive, the dielectric layer may include the additive in the form of a metal oxide during its manufacturing process. The metal oxide additive may include, for example, at least one of $MnO_2$, $Dy_2O_3$, $BaO$, $MgO$, $Al_2O_3$, $SiO_2$, $Cr_2O_3$ and $CaCO_3$.

Meanwhile, as shown in the drawings, the body 110 may include a first surface S1 and a second surface S2 which are opposite to each other and to which the plurality of internal electrodes 121 and 122 are respectively exposed, and a third surface S3 and a fourth surface S4 opposing each other in a direction (X-direction) in which the plurality of internal electrodes 121 and 122 are stacked on each other, wherein the electrode layers 141 and 151 include the first regions 141a and 151a respectively covering the first and second surfaces S1 and S2 of the body 110, and each of the second regions 141b and 151b covering the third and fourth surfaces S3 and S4 of the body 110.

The plurality of internal electrodes 121 and 122 may be obtained by printing a paste, which includes a conductive metal (e.g., nickel (Ni), silver (Ag), copper (Cu), titanium (Ti), palladium (Pd) or the like) having a predetermined thickness, on one surface of a ceramic green sheet and then sintering the same. In this case, the plurality of internal electrodes 121 and 122 may be the first and second internal electrodes 121 and 122 exposed from the body 110 in opposite directions. The first and second internal electrodes 121 and 122 may be connected to different external electrodes 131 and 132, thus having different polarities while being driven, and may be electrically separated from each other by the dielectric layer 111 disposed therebetween. However, the number of the external electrodes 131 and 132 or a method in which the external electrodes 131 and 132 and the internal electrodes 121 and 121 are respectively connected to each other may depend on exemplary embodiments.

The external electrodes 131 and 132 may include electrode layers 141 and 151 positioned externally on the body 110 and connected to the internal electrodes 121 and 122, respectively. In this case, the external electrodes 131 and 132 may be first and second external electrodes 131 and 132, and respectively connected to the first and second internal electrodes 121 and 122. In addition, the first and second external electrodes 131 and 132 may respectively include first and second electrode layers 141 and 151. Hereinafter, the first and second electrode layers 141 and 151 are referred to only as the electrode layers 141 and 151. The external electrodes 131 and 132 may further include resin electrode layers 142 and 152 respectively covering the electrode layers 141 and 151 in addition to the electrode layers 141 and 151, and may further include plating layers 143 and 153 covering the resin electrode layers 142 and 152.

In this embodiment, the electrode layers 141 and 151 may respectively include first regions 141a and 151a and second regions 141b and 151b, which are separated from each other based on their positions. As shown in the drawings, the first regions 141a and 151a may respectively cover the first and second surfaces S1 and S2 of the body 110, and the second regions 141b and 151b may respectively cover the third and fourth surfaces S3 and S4 of the body 110. Here, the second regions 141b and 151b may respectively have the surface roughness lower than that of the first regions 141a and 151a. The electrode layers 141 and 151 may have the surface roughness different depending on the regions, and may thus have improved structural stability while securing their moisture-resistance reliability. In detail, the first regions 141a and 151a may respectively cover the first and second surfaces S1 and S2 of the body 110, and may thus have high surface roughness while being in contact with the resin electrode layers 142 and 152 at a relatively wide area. Such a structure may improve respective bonding forces between the first regions 141a and 151a and the resin electrode layers 142 and 152, thereby improving durability of the electrode layers 141 and 151. This structural characteristic is described with reference to FIG. 4. Although FIG. 4 shows only the first region 141a included in the first electrode layer 141, the same description may be applied to the first region 151a of the second electrode layer 151.

The first regions 141a and 151a and the second regions 141b and 151b respectively included in the electrode layers 141 and 151 may each include an agglomeration of metal particles. In addition, the first regions 141a and 151a and the second regions 141b and 151b may each further include a glass component G. As shown in FIG. 4, the first regions 141a and 151a may each include an agglomeration of flake-shaped particles 161, and may thus have the high surface roughness. FIG. 4 shows that the flake-shaped particles 161 are in contact with each other while each particle 161 maintains an independent shape. However, when an aggregate is formed in a firing process of the electrode layers 141 and 151, a boundary between the flake-shaped particles 161 may not be clear. The flake-shaped particle 161 may have a length of its major axis and a length of its minor axis different from each other, and in this case, the length of the major axis may be more than twice the length of the minor axis. In addition, the major and minor axes of the flake-shaped particles 161 may be obtained by an image taken from a cross-section of the capacitor, cut in a direction in which the plurality of internal electrodes 121 and 122 are stacked on each other, in which a longest direction of the particle may be referred to as the major axis and a direction perpendicular to the major axis may be referred to as the minor axis. In this case, the cross-section of the capacitor may be each cross-section thereof, cut in the plurality of regions and taken at equal intervals. The first regions 141a and 151a may further include spherical particles 162 in addition to the flake-shaped particles 161 to have increased filling amount of the metal component, and the spherical particle 162 may be not only a particle whose major and minor axes have substantially the same length, but also a particle whose major and minor axes have difference in length within 10%.

The resin electrode layers 142 and 152 may respectively include a resin layer 171 and metal particles 172 dispersed therein, and the metal particle 172 may entirely form an aggregate. As shown in the drawings, the resin layer may fill surfaces of the electrode layers 141 and 151, and as a more specific example, recessed portions R on the first regions 141a and 151a. This structural characteristic may improve the respective bonding forces between the electrode layers 141 and 151 and the resin electrode layers 142 and 152, thus effectively reducing a delamination defect of the external electrodes 131 and 132.

As described above, the second regions 141b and 151b may respectively have the surface roughness lower than that of the first regions 141a and 151a. To this end, as shown in FIG. 5, the second regions 141b and 151b may include spherical particles 163, and may further include an agglomeration of the particles 163. Like the spherical particle 162 each included in the first regions 141a and 151a, the spherical particle 163 may be not only a particle whose major and minor axes have substantially the same length, but also a particle whose major and minor axes have difference in length within 10%. Ra may indicate each surface roughness of the first regions 141a and 151a and the second regions 141b and 151b, and may be measured from a sampled region (e.g., 5*5 pmt) by using an atomic force microscopy AFM. The second regions 141b and 151b may have the relatively low surface roughness, whereas a coverage indicating a degree of covering the surfaces of the body 110 may be relatively high, thus having excellent moisture-resistance characteristic. As described above, in this embodiment, the first regions 141a and 151a requiring the high bonding forces between the electrode layers 141 and 151 and the rest layers of the external electrodes 131 and 132, for example, the resin electrode layers 142 and 152, may have the relatively high surface roughness, and the second regions 141b and 151b requiring moisture-resistance reliability may the relatively high surface roughness. This structural characteristic may generally improve all of these two characteristics of the external electrodes 131 and 132.

The second regions 141b and 151b having the excellent coverage due to the relatively low surface roughness as described above may respectively cover edges of the body 110. In this case, the edges of the body 110 may be regions in which the first surface S1 and the third surface S3 are connected to each other, the first surface S1 and the fourth surface S4 are connected to each other, the second surface S2 and the third surface S3 are connected to each other, and the second surface S2 and the fourth surface S4 are connected to each other. The edge of the body 110 may be more vulnerable to moisture or plating solution. When the second regions 141b and 151b, having the excellent coverage, are positioned at the edge of the body 110, it is possible to effectively reduce a possibility in which the moisture or the plating solution infiltrates into the body 110. In addition, in the process of applying the conductive paste, each portion of the second regions 141b and 151b, covering the edge of the body 110, may be made to have a relatively small thickness. In detail, each portion of the second regions 141b and 151b, covering the edges of the body 110, may have a thickness equal to or lower than a minimum thickness of each of the first regions 141a and 151a. In addition, as shown in the drawings, a maximum thickness of each of the first regions 141a and 151a may be greater than a maximum thickness of each of the second regions 141b and 151b. In this case, each thicknesses of the first regions 141a and 151a and the second regions 141b and 151b may be measured from the image taken from the cross-section of the capacitor, cut in the direction (X-direction) in which the plurality of internal electrodes 121 and 122 are stacked on each other. The image may be obtained by a scanning electron microscope (SEM).

Referring to FIGS. 4 and 5 together, the first regions 141a and 151a may each have a higher pore density than the second regions 141b and 151b. In this case, the pore density in the first and second regions 141a, 151a, 141b and 151b may be a ratio of areas in which pores $V_1$ and $V_2$ exist in the image taken from the cross-section of the capacitor, cut in the direction (X-direction) in which the plurality of internal electrodes 121 and 122 are stacked on each other. That is, each area occupied by the pore $V_1$ in the first regions 141a and 151a based on the cross-section of the capacitor may be larger than each area occupied by the pore $V_2$ in the second regions 141b and 151b, and this area may have a shape which may be obtained by using the flake-shaped particles 161 in the first regions 141a and 151a. FIGS. 4 and 5 show that glass G fills all portions occupied by the pores $V_1$ of each of the first regions 141a and 151a and by the pores $V_2$ of the second regions 141b and 151b. However, some of the pores $V_1$ and $V_2$ may be empty without being filled with the glass G. The pore density may be obtained by processing SEM images of the cross-section with an image processing software such as ImageJ.

Meanwhile, the metal particles 161, 162 and 163, included in the electrode layers 141 and 151, may be made of a highly conductive metal, for example, a metal such as copper (Cu), nickel (Ni), Silver (Ag), platinum (Pt) or aluminum (Al), or an alloy thereof. In addition, the glass G included in the electrode layers 141 and 151 may be made of a material having excellent characteristics such as reactivity, compactness, plating resistance and the like, may be barium (Ba)-zinc (Zn) based glass, dysprosium (Dy)-zirconium (Zr) based glass or the like for example, and may also be a glass including components such as boron (B) and silicon (Si).

As the rest components of the external electrodes 131 and 132, the plating layers 143 and 153 may each include nickel (Ni), tin (Sn), gold (Au), platinum (Pt) or the like, and may have a multilayer structure such as Ni/Sn. As in this embodiment, when the plating layers 143 and 153 are formed, the second regions 141b and 151b of the electrode layers 141 and 151 may effectively block the plating solution from infiltrating into the body 110.

Figure 6:
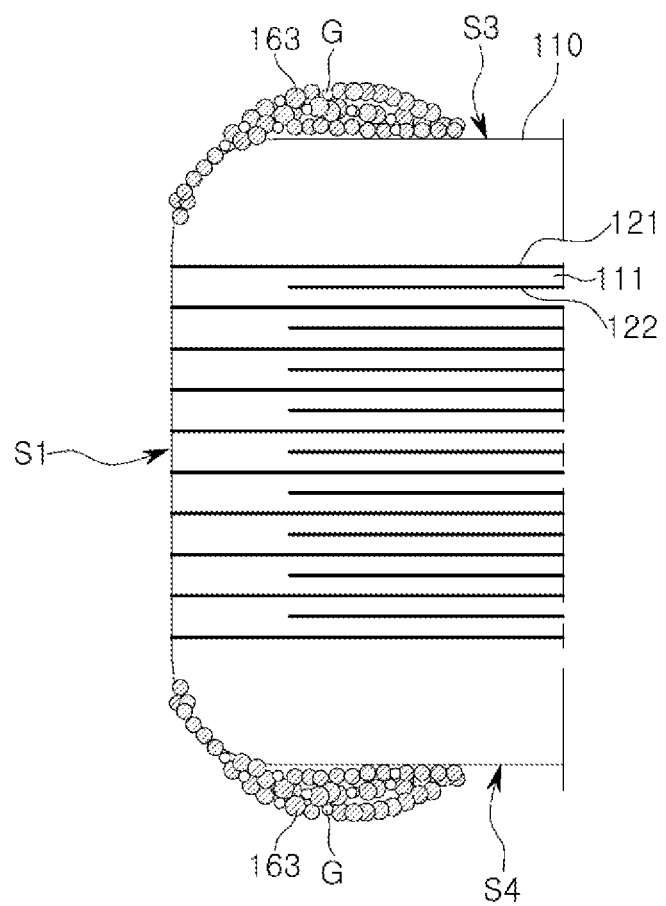
FIGS. 6 through 8 are cross-sectional views respectively illustrating some of examples of manufacturing the external electrode according to an exemplary embodiment of the present disclosure.
Figure 7:
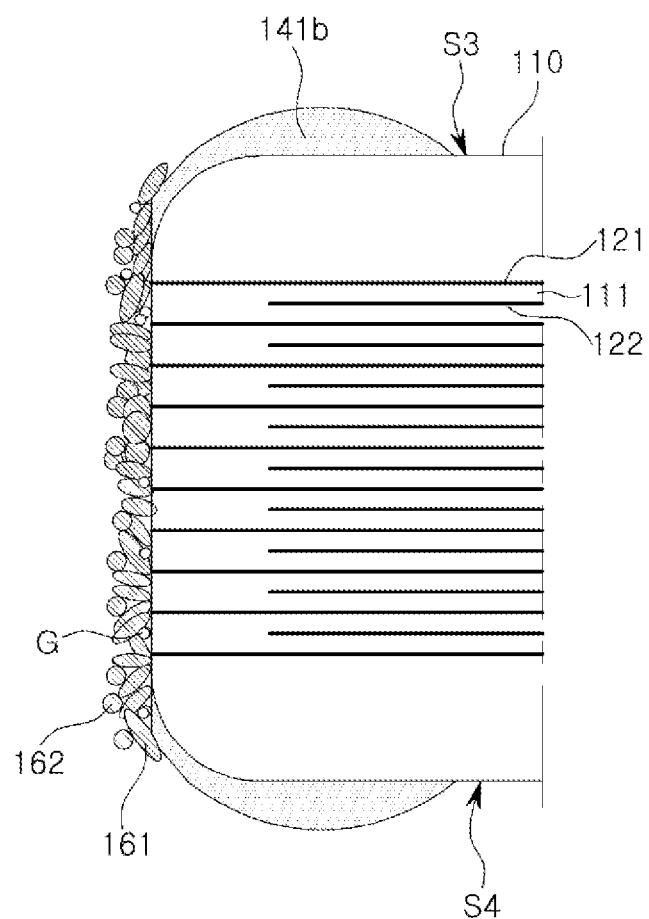
Figure 8:
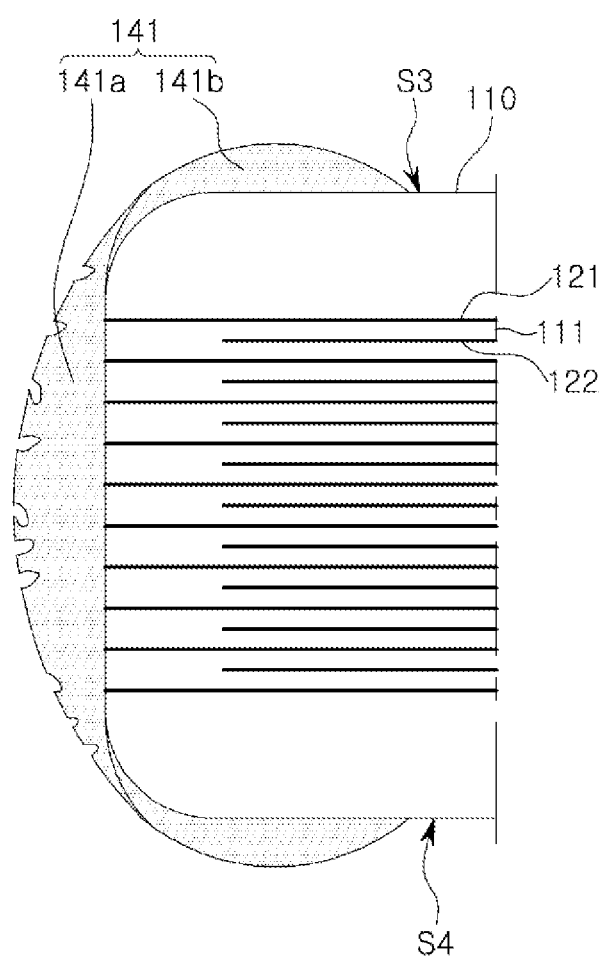

Examples of manufacturing the external electrode according to an exemplary embodiment of the present disclosure are described with reference to FIGS. 6 through 8. The description of the manufacturing method of the external electrode may more fully show the structural characteristic of the above-described external electrode, in particular, the electrode layer. First referring to FIG. 6, the conductive paste including the metal particle 163 and the glass G may be applied to the third surface S3 and the fourth surface S4 among the surfaces of the body 110, thereby forming the second regions 141b and 151b in the electrode layers 141 and 151. Here, the metal particle 163 may be the spherical metal particle 163 as described above. In addition, the conductive paste for forming the second regions 141b and 151b may cover the edges of the body 110. Next, as shown in FIG. 7, the conductive paste including the metal particles 161 and 162 and the glass G may be applied to the first surface S1 and the second surface S2 among the surfaces of the body 110, thereby forming the first regions 141a and 151a. Here, the second surface S2 is omitted from the drawing. In addition, FIG. 8 shows the electrode layers 141 and 151 in a state in which the second regions 141b and 151b are sintered. In this case, before applying the conductive paste for forming the first regions 141a and 151a, the conductive paste for forming the second regions 141b and 151b may be sintered to form the second regions 141b and 151b. Alternatively, unlike the drawing, the conductive paste for forming the first regions 141a and 151a and the conductive paste for forming the second regions 141b and 151b may be sintered simultaneously. As described above, the conductive paste for forming the first regions 141a and 151a may include the flake-shaped particles 161 in order for the first regions 141a and 151a to have the higher surface roughness, and may further include the spherical particles 162 in addition thereto. In addition, as shown in the drawing, the first regions 141a and 151a may respectively be extended to partially cover ends of the second regions 141b and 151b, thus more effectively protecting the edges of the body 110.

As set forth above, the multilayer capacitor according to an exemplary embodiment of the present disclosure may have at least one of the improved characteristics such as the external electrode made smaller, having the uniform thickness, etc.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a dielectric layer and a plurality of internal electrodes stacked on each other having the dielectric layer interposed therebetween; and
external electrodes each including:
an electrode layer positioned externally on the body and connected to the plurality of internal electrodes, and,
a resin electrode layer covering the electrode layer, the resin electrode layer including a resin layer and metal particles dispersed in the resin layer,
wherein the body includes a first surface and a second surface, opposing each other, and from which the plurality of internal electrodes extend, and a third surface and a fourth surface which are connected to the first surface and the second surface, and oppose each other in a direction in which the plurality of internal electrodes are stacked on each other,
the electrode layer includes a first region covering the first or second surface and a second region covering the third or fourth surface and having surface roughness lower than that of the first region, and
a portion of the resin electrode layer adjacent to the first region has a surface roughness lower than that of the first region.

2. The multilayer capacitor of claim 1, wherein the first region and the second region each include an agglomeration of metal particles.

3. The multilayer capacitor of claim 2, wherein the first region includes the agglomeration of flake-shaped particles.

4. The multilayer capacitor of claim 2, wherein the second region includes the agglomeration of spherical particles.

5. The multilayer capacitor of claim 1, wherein the first region and the second region each further include a glass component.

6. The multilayer capacitor of claim 1, wherein the resin layer of the resin electrode layer fills a recess portion in a surface of the electrode layer.

7. The multilayer capacitor of claim 1, wherein the second region covers edges of the body.

8. The multilayer capacitor of claim 7, wherein the edges of the body are regions in which the first surface and the third surface are connected to each other, the first surface and the fourth surface are connected to each other, the second surface and the third surface are connected to each other, and the second surface and the fourth surface are connected to each other.

9. The multilayer capacitor of claim 7, wherein a portion of the second region, covering the edges of the body, has a thickness equal to or lower than a minimum thickness of the first region.

10. The multilayer capacitor of claim 1, wherein a maximum thickness of the first region is greater than a maximum thickness of the second region.

11. The multilayer capacitor of claim 1, wherein the first region has a higher pore density than the second region.

12. The multilayer capacitor of claim 11, wherein the pore density in the first and second regions is a ratio of areas in which pores exist in a cross-section of the capacitor, cut in the direction in which the plurality of internal electrodes are stacked on each other.

13. The multilayer capacitor of claim 1, wherein the first region is extended to partially cover an end of the second region.

14. The multilayer capacitor of claim 1, wherein the first region is extended beyond an end of the second region.

\* \* \* \* \*